United States Patent [19]
Borg et al.

[11] Patent Number: 5,898,820
[45] Date of Patent: Apr. 27, 1999

[54] DEVICE FOR INJECTING HIGH ENERGY LASER BEAM INTO OPTICAL FIBER

[75] Inventors: Lars Borg, Saratoga; Geoffrey C. Sherwood, Milpitas, both of Calif.

[73] Assignee: Adobe Systems Incorporated, San Jose, Calif.

[21] Appl. No.: 08/709,123

[22] Filed: Sep. 5, 1996

[51] Int. Cl.[6] .............................. H04M 1/40; G06K 9/36; G06F 15/00
[52] U.S. Cl. ......................... 395/109; 358/455; 358/456; 358/465; 358/466; 382/270
[58] Field of Search .................................. 358/455, 456, 358/457, 465, 534, 466; 395/106, 109; 382/270; 345/147, 148

[56] References Cited

U.S. PATENT DOCUMENTS

| | | | |
|---|---|---|---|
| 5,053,887 | 10/1991 | Thompson | 358/457 |
| 5,216,753 | 6/1993 | Ng | 395/109 |
| 5,444,551 | 8/1995 | Miller et al. | 358/456 |
| 5,489,991 | 2/1996 | McMurray | 358/456 |
| 5,555,102 | 9/1996 | Dalton | 358/456 |

Primary Examiner—Edward L. Coles
Assistant Examiner—Mark Wallerson
Attorney, Agent, or Firm—Fish & Richardson P.C.

[57] ABSTRACT

A method of halftoning a sample value from an intensity range including the steps of providing threshold arrays having threshold values from distinct ranges, one of which is the same as the intensity range, selecting the one with the same range as the intensity range and using the selected threshold array to halftone the sample value. Embodiments may include the following features. The threshold arrays are a first one having a first threshold value range and a second one having a second threshold value range that has more levels than does the first threshold value range. The first threshold array is built by scaling each value in the second threshold array down to the range of the first threshold array. The scaling is done by dividing by 257 and rounding up to the next whole number. The first threshold array has a threshold value range of zero to 255 and the second threshold array has a threshold value range of zero to 65535 or zero to 4095. Tone correction is performed using a transfer function mapping an 8-bit input sample value to a tone-corrected output sample value having more than 8 bits.

24 Claims, 3 Drawing Sheets

DEVICE FOR INJECTING HIGH ENERGY LASER BEAM INTO OPTICAL FIBER

BACKGROUND

The invention relates to the use of halftone threshold arrays on digital output devices, and more particularly to threshold arrays for increased levels per color component.

A continuous tone image does not print well on most printing devices, so the image is usually printed as pattern of dots based on a grid. The grid generally consists of an array of halftone cells, each of which represents one section of continuous tone in the original image. When reproducing a halftoned image using a digital recording device, a halftone cell consists of a number of device pixels. In a device that produces only black and white pixels, some of the display pixels of each halftone cell are turned black to form dots that are relatively larger or smaller to represent darker or lighter portions of the original continuous tone image. In a dark halftone cell, most of the pixels are black, while in a light halftone cell, most of the pixels are white. A complete grid of the original image is composed of many such halftone cells, each of which has an independent density of displayed pixels and therefore a different apparent darkness when viewed from a distance.

A conventional method of selecting which dots to turn black works as follows. For a given halftone cell, the original image is sampled at each display pixel location in the halftone cell to obtain a sample value. This sample value is represented digitally as a number in a fixed range, typically zero to 255. The sample value is then compared to a threshold value at the display pixel location and the display pixel is turned white if the sample value is greater than the threshold value, and black otherwise. The threshold values, in turn, are supplied by a threshold array, which provides a threshold value for each pixel in the halftone cell. This process is carried out for each halftone cell of the image.

The term threshold array is commonly used to denote a set of generic pixels, each of which has a "threshold value". The device plane is tiled with copies of the threshold array, so that each device pixel is mapped to one generic pixel and its threshold value. After the desired sample value for the device pixel is computed—from the image being halftoned, for example—it is compared to the threshold value. If the sample level is greater than the threshold value, the device pixel is left white; otherwise, it is marked black.

A threshold array is much like a sampled image: it is generally a rectangular array of pixel values defined entirely in device space. It can be built algorithmically, by use of a spot function, for example, or it can be built by hand. The sample values occupy some number of bits: in a typical system, the sample values occupy 8 bits that represent gray levels ranging from zero for black and 255 for white.

The scheme generalizes to monochrome devices with multiple bits per pixel. For example, with 2 bits per device pixel, each device pixel can directly represent one of four different gray sample levels. For each device pixel that is to be painted with some in-between gray level, the corresponding pixel of the threshold array is consulted to determine whether to use next-lower or next-higher directly-representable gray level. In this situation, the samples of the threshold array do not represent absolute gray values, but rather gradations between two adjacent representable gray levels.

Halftoning is also used to approximate continuous-tone colors by a pattern of pixels that can achieve only a limited number of discrete colors. The input to the halftone function includes continuous-tone color components in the device's native color space. The output includes pixels representing colors the device can reproduce. Some devices can reproduce continuous-tone colors directly. These are known as "contone" devices. For such devices, halftoning is not required and color components can be transmitted directly to the marking engine of the device.

A halftone defined in this way can also be used with color output devices whose pixels consist of component colors that are either completely on or completely off. Most color printers, but not color displays, work this way. Halftoning is applied to each color component independently, producing shades of that color. The red, green, and blue values, for example, are created independently as gray levels, and a threshold array is applied to each color.

Further information on halftoning may be found in U.S. Pat. Nos. 5,285,291 and 5,305,118, as well as in such standard reference works as Foley, van Dam et al., Computer Graphics, Addison-Wesley (2d ed. 1992), pp. 568–573, and Adobe Systems Incorporated, Adobe PostScript® Language Reference Manual, Addison-Wesley (2d ed. ©1990), pp. 309–319.

SUMMARY

In general, in one aspect, the invention features a method of halftoning a sample value from an intensity range.

The method includes the steps of providing threshold arrays having threshold values from distinct ranges, one of which is the same as the intensity range, selecting the one with the same range as the intensity range, and using the selected threshold array to halftone the sample value. Preferred embodiments of the invention include one or more of the following features. The threshold arrays are a first one having a first threshold value range and a second one having a second threshold value range that has more levels than does the first threshold value range. The first threshold array is built by scaling each value in the second threshold array down to the range of the first threshold array and storing each scaled value in the first threshold array. The first and second threshold arrays are stored consecutively in a memory. The first threshold array has a threshold value range of zero to 255 and the second threshold array has a threshold value range of zero to 65535 or zero to 4095. Tone correction is performed using a two-part transfer function, where the first part has an output value range equal to the first threshold value range and the second part provides low-order bits to calculate transfer function values corresponding to the second threshold value range. Tone correction is performed using a transfer function mapping an 8-bit input sample value to a tone-corrected output sample value having more than 8 bits.

In general, in another aspect, the invention features a method building a first threshold array. The method includes the steps of acquiring a second threshold array having a second threshold value range, and building a first threshold array having a first threshold value range smaller than the second threshold value range by scaling each value in the second threshold array down to the range of the first threshold array and storing each scaled value in the first threshold array. Preferred embodiments of the invention include one or more of the following features. The first threshold value range is zero to 255 and the second threshold value range is zero to 65535, and the scaling is done by dividing by 257 and rounding up to the next whole number.

In general, in another aspect, the invention features a raster output device configured to halftone a sample value having an intensity level in an intensity range. The device has a plurality of threshold arrays each having threshold values in one of a plurality of distinct ranges, one of which ranges is the same as the intensity range; means for selecting the one of the threshold arrays having a threshold value range that is the same as the intensity range; and means for using the selected threshold array to halftone the sample value. Preferred embodiments of the invention include one or more of the following features. The threshold arrays include a first threshold array having a first threshold value range and a second threshold array having a second threshold value range that has more levels than does the first threshold value range.

In general, in another aspect, the invention features a computer program, residing on a computer-readable medium, having instructions for causing a raster output device to select a sample value having an intensity level in an intensity range; to provide a plurality of threshold arrays having threshold values in a plurality of distinct ranges, one of which ranges is the same as the intensity range; to select the one of the threshold arrays having a threshold value range that is the same as the intensity range; and to use the selected threshold array to halftone the sample value. Preferred embodiments of the invention include one or more of the following features. The instructions to provide threshold arrays include instructions to acquire a second threshold array having a second threshold value range, and to build a first threshold array having a first threshold value range smaller than the second threshold value range by scaling each value in the second threshold array down to the range of the first threshold array and storing each scaled value in the first threshold array. The intensity range is zero to 4095 or zero to 65535. The computer program has instructions to apply to 8-bit input values a transfer function of 256 elements mapping 8-bit input to tone-corrected 16-bit output values, and to calculate the sample value as a shading function of tone-corrected output values of the transfer function. The computer program has instructions to calculate the sample value as a shading function, and to tone correct the sample value by applying a table interpolated from a transfer function mapping 8-bit input to tone-corrected 16-bit output.

Among the advantages of the invention are one or more of the following. The invention can be used with any kind of sample value, including samples derived from scanned images, fill values for selected colors or shades, calculated color values (such as for shading), planar or chunky values, or monochrome values. In terms of an embodiment providing a combination 8-bit and a 16-bit halftone, the amount of code (program instructions) that needs to be implemented, and the amount of space taken in a device memory (typically ROM) by code are both reduced, because the 8-bit code can be reused. A savings in code memory and implementation effort also arises because no new code is needed to process 8-bit sample data in a device using 16-bit halftones.

Other features and advantages of the invention will become apparent from the following description and from the claims.

DETAILED DESCRIPTION

Figure 1:
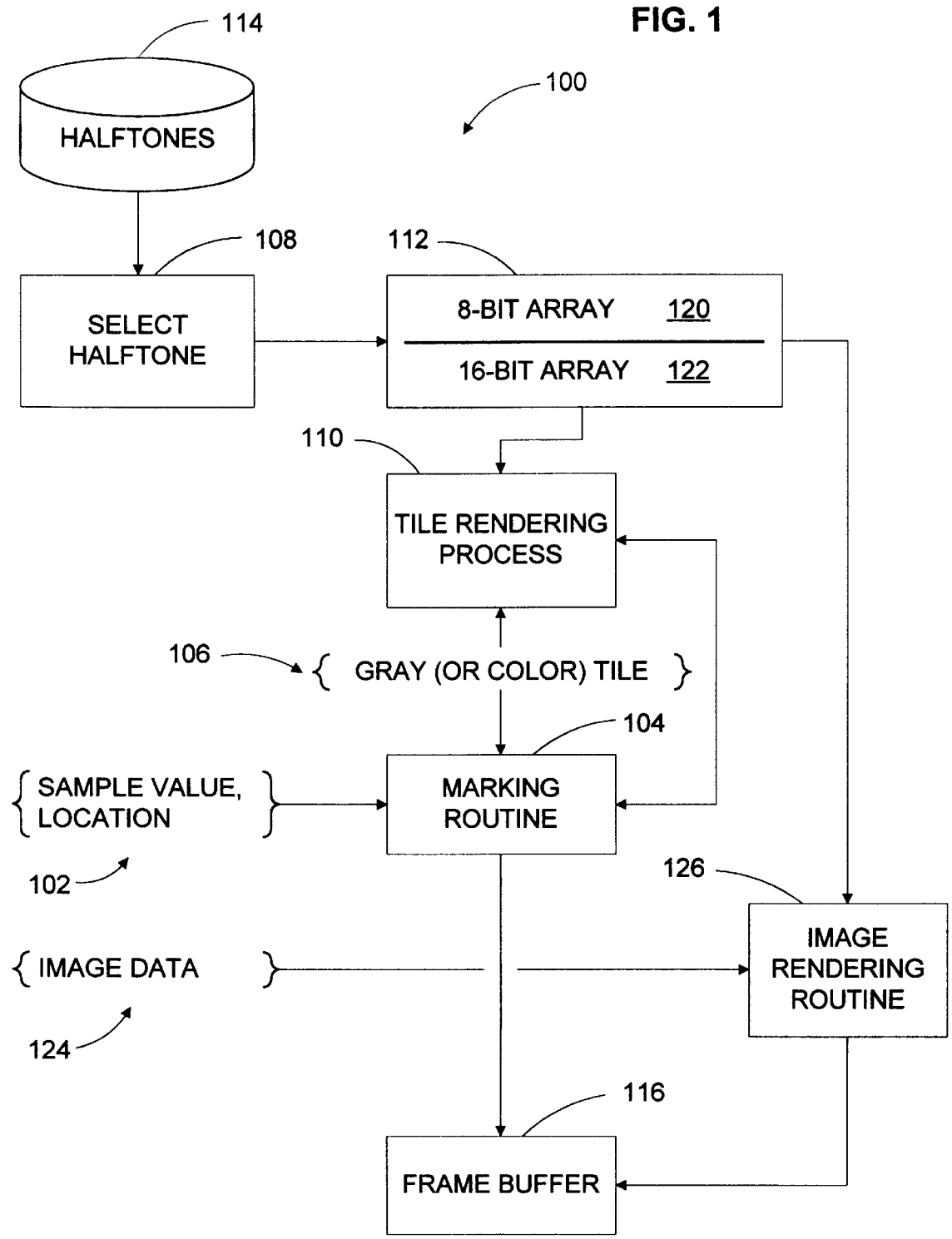
FIG. 1 is a flow diagram of a method using a threshold array in accordance with the present invention.

Referring to FIG. 1, a conventional rendering and marking process for non-contone raster output devices is enhanced by the addition of a method using a multiple-depth threshold array (100). This process may be combined with the use of fractional tiles, described in commonly-owned, copending U.S. application Ser. No. 08/705,041, titled Efficient Gray Tile Storage, filed Sep. 5, 1996. In a printer, for example, a marking routine 104 is called to print a sample gray or color level at a location (102). The marking routine is used for rendering fills, strokes, and the like, and thus requests a gray or color tile from a tile rendering process 110. If the requested tile 106 is not available in a cache, the rendering process 110 builds the tile from a threshold array 112. When it has the requested tile 106, the marking routine 104 copies selected pixels from the tile into a frame buffer 116.

When marking regions that are not uniformly one color, such as regions derived from a digitized image, it is generally not advantageous to render and use tiles 106. Instead, an image rendering routine 126 is used to render such image data 124 a pixel at a time using the threshold array 112 directly. The output of the image rendering routine 126 is a pixel stored in the frame buffer 116.

The threshold array 112 has two or more parts, to allow sample values drawn from two or more distinct ranges (sets of possible values) to be used. In the embodiment to be described, the threshold array has two parts 120 and 122. One part is an 8-bit wide threshold array 120 with 8-bit threshold values for sample values having 8 bits (i.e., ranging from zero to 255). The second part is a 16-bit wide threshold array 122 with 16-bit threshold values for sample values having 16 bits (i.e., ranging from zero to 65535). The wider threshold values allow the threshold array to be used with higher-precision inputs having 65536 levels of color (or gray) instead of 256 levels. Thus, with the wider threshold array, finer resolution sample values can be rendered.

With a 16-bit threshold array, sample values of any width up to 16 bits can be halftoned. For example, if a sample value has a range of only 12 bits (zero to 4095), the high-order 12 bits of the threshold array are used.

The two-depth arrangement is advantageous as an extension to a printing environment based on the narrower, 8-bit sample and threshold values (the old format), because the wider values can be used selectively in some of the processing steps, whose components are modified to accommodate the wider values, while the remainder of the environment remains unchanged and uses only the narrower values. A further advantage arises from the circumstance that 8-bit processing generally uses fewer resources (time and memory) than does processing for wider values. Providing both 8-bit and 16-bit values allows performance to be matched to the need for fine gradations in sample intensity. Thus, it is advantageous in a printing device to store the old and new threshold arrays as a single threshold array with two sections, where the first section is the old 8-bit version 120 and the second section is a new 16-bit version 122. In this way, the tile rendering process 110 and the marking routine 104, for example, can be used without change for 8-bit values. The multiple-depth threshold array 112 need not be stored contiguously, however; and its parts need not even be stored simultaneously in the same memory.

A page description language interpreter, such as one the Adobe® PostScript® language—or other subsystem controlling a printing device such as a commercial laser printer or a film imagesetter—typically provides a halftone selection module 108 that can be invoked to select as the current threshold array 112 one of possibly numerous halftone definitions 114. Both an 8-bit and a 16-bit threshold array can be derived from one 16-bit threshold array. A 16-bit threshold array may be created using any conventional technique, including mechanically extending an existing 8-bit threshold array by using pseudo-noise for the lower 8 bits. A 16-bit threshold array may also be created with compensation for predetermined transfer characteristics of a printing device, by applying the teachings of commonly-owned U.S. patent application Ser. No. 08/231,443, for example, the disclosure of which is incorporated here by this reference. With such a calibrated 16-bit threshold array as the 16-bit part (threshold array 122), the 8-bit part 120, when generated as described below, will have the same device transfer calibration.

Figure 2:
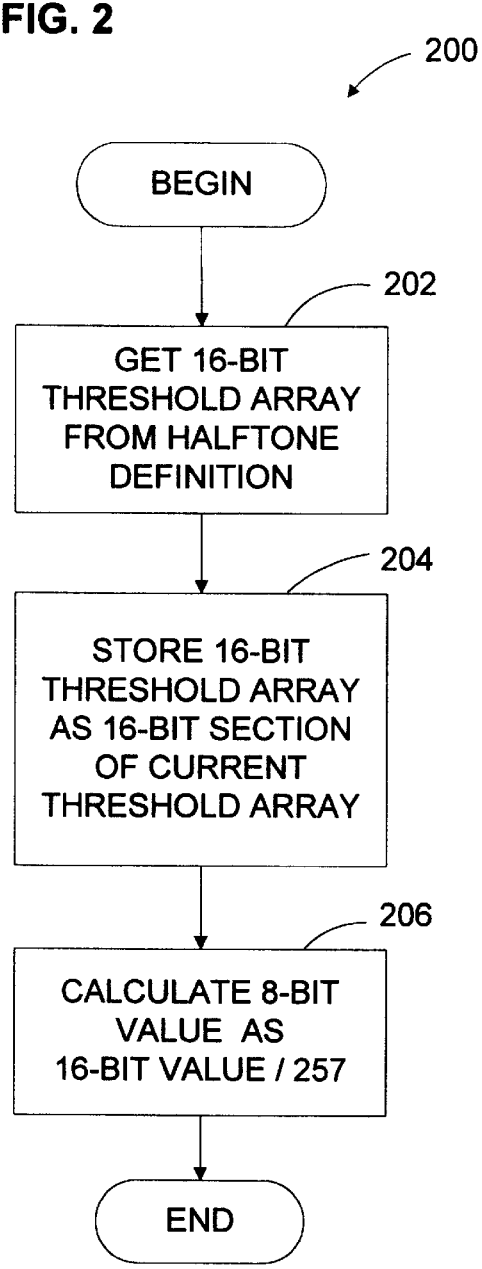
FIG. 2 is a flow diagram of a method converting a 16-bit threshold array to an 8-bit threshold array.

Referring to FIG. 2, an 8-bit threshold array is extracted from a 16-bit threshold array as follows (200). When a 16-bit halftone is selected (202), the 16-bit threshold array is copied into the 16-bit part 122 (FIG. 1) of the current threshold array (204). The 8-bit threshold value corresponding to each 16-bit threshold value is then calculated by dividing the 16-bit value by 257 and rounding the result up to the next whole number.

One use for 16-bit halftones is in the production of smooth blends or shading. On a typical printer, 256 levels per color component in the raster image processor are sufficient because the printer engine cannot accurately print 256 distinct levels per color component. However, printing presses and imagesetters can accurately produce more than 256 levels per color component. One way to achieve smooth blends for such devices is by calculating a blending function that produces a value having greater precision—for example, 12 bits (4096 levels) rather than 8 bits—and to provide the greater precision value to a marking routine or an image rendering routine (such as routine 126 of FIG. 1) that can accept the wider sample values. As will be described, 8-bit inputs to the blending function can be tone corrected using a 16-bit precision transfer function of 256 elements before the blending is done.

Figure 3:
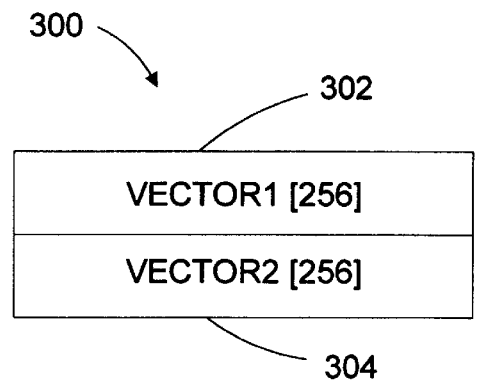
FIG. 3 illustrates a structure for a two-part transfer function.

Referring to FIG. 3, a transfer function (also known as a tone correction function, of which a gamma correction function is an example) is commonly used to compensate for (typically non-linear) device peculiarities. A transfer function maps a sample value input to a corrected sample value output, and would normally be applied before a sample value is halftoned by marking routine 104 or image rendering routine 126 (FIG. 1).

To support the use of wider, 16-bit sample values in halftoning, it is advantageous to have a transfer function that provides tone-corrected 16-bit values. As was done in storing the two-part threshold array, a transfer function 300 is stored in two consecutive parts 302 and 304, although non-consecutive arrangements may also be used. The first part 302 is an old 8-bit transfer function vector 1, which has the advantage of allowing reuse of 8-bit code that uses the old transfer function format. A new vector (vector2) 304 provides the low order bits for a 16-bit output value. Both vector1 302 and vector2 304 have 256 8-bit elements. Each element of vector1 302 (the old 8-bit transfer function) is an unsigned integer. It provides a lookup table with 8 bits of input and 8 bits of output. The elements of vector2 304 are signed integers representing the lower 8 bits of a transfer value. A 16-bit output value can be obtained from an 8-bit sample value (index) as follows:

output=vector1 [index]*257+vector2 [index].

The range of 8-bit levels is zero to 255, or hexadecimal 0-FF. The range of 16-bit levels is zero to 65535, or hexadecimal 0-FFFF. Thus, an 8-bit value can be converted to its corresponding 16-bit value by multiplying it by 257.

A transfer function with only 256 elements, stored with double precision, may provide sufficient precision in common situations. When it does, use of a 256-element format has the advantage of requiring only a fraction of the memory that would be required to map 16-bit inputs. When 16-bit sample values are created by a function—such as a shading function—applied to 8-bit values, the transfer function can be applied before the shading is calculated, in which case a 256-element transfer function is sufficient.

With the double-precision transfer function just described, a table mapping a 12-bit input, for example, to a tone-corrected 16-bit output can readily be constructed by interpolating between the 8-bit input values of the double-precision transfer function 300. Such an interpolation is useful because the steps in output value at one or the other end of the transfer function tend to be very small, so that having a 16-bit output value provides useful resolution, which carries over in the interpolation.

In addition, a transfer function having more elements may be defined directly as a supplement to the old function defined by vector1 302. It is not necessary that separate elements for all of 16-bit combinations be provided. For example, limiting sample values to 12 bits—which provides a range that is more than ample for most applications—allows a transfer function of 4096 elements to be used.

Figure 4:
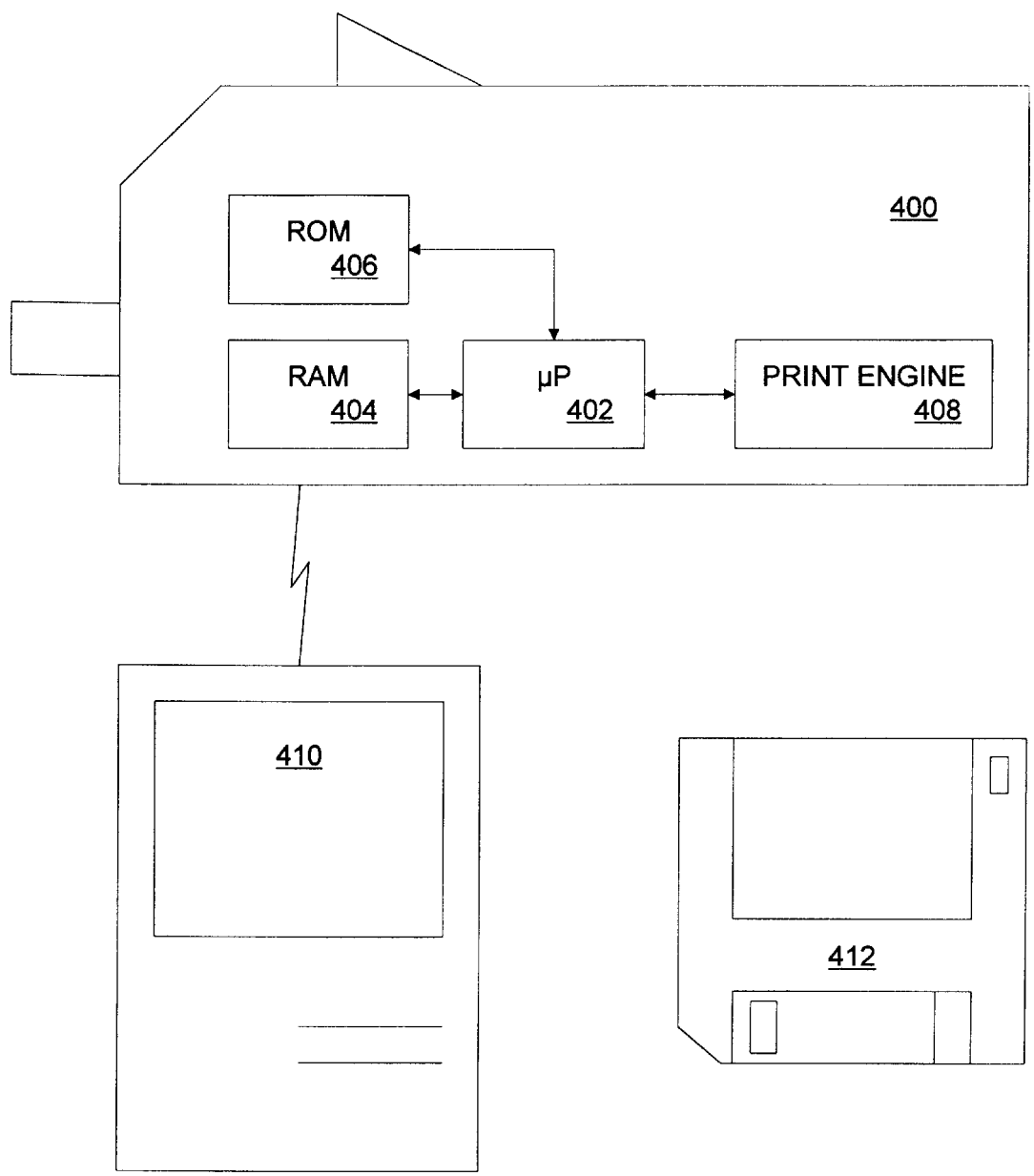
FIG. 4 is a diagram illustrating apparatus embodying the present invention.

Referring to FIG. 4, the invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

By way of example, a printing device 400 implementing an interpreter for a page description language, such as the PostScript® language, includes a microprocessor 402 for executing program instructions stored on a printer random access memory (RAM) 404 and a printer read-only memory (ROM) 406 and controlling a print marking engine 408. The RAM 404 is optionally supplemented by a mass storage device such as a hard disk (not shown). The essential elements of a computer are a processor for executing instructions and a memory. A computer can generally also receive programs and data from a storage medium such as an internal disk (not shown) or a removable disk 412. These elements will be found in a conventional desktop or workstation computer 410 as well as other computers suitable for executing computer programs implementing the methods described here, which may be used in conjunction with any digital print engine or marking engine, display monitor, or other raster output device capable of producing color or gray scale pixels on paper, film, display screen, or other output medium.

Other embodiments are within the scope of the following claims. For example, the order of steps of the invention may be changed by those skilled in the art and still achieve desirable results. The marking routine may be modified to accept both wide and narrow sample values, and accordingly select either to use a tile based on a narrow threshold array or to use a wide threshold array directly to render the value. The threshold arrays need not be square, rectangular or of any other particular shape.

What is claimed is:

1. A method of halftoning a sample value drawn from a range of possible sample values having a sample value bit width, comprising:

providing a plurality of threshold arrays having array elements in which are stored threshold values, each threshold array being characterized by the bit width of the threshold values stored in its array elements, the plurality of threshold arrays comprising a first threshold array having a first element bit width and a second threshold array having a second element bit width wider than the first element bit width; and selecting from the threshold arrays a threshold array having an element bit width at least as large as the sample value bit width and using the selected threshold array to halftone the sample value.

2. The method of claim 1, wherein one of the plurality of threshold arrays has an element bit width identical to the sample value bit width.

3. The method of claim 1 further comprising:

building the first threshold array by scaling each value in the second threshold array down to the bit width of the first threshold array and storing each scaled value in the first threshold array.

4. The method of claim 1 where the first and second threshold arrays are stored consecutively in a memory.

5. The method of claim 1 where the first threshold array has an element bit width of 8 bits and the second threshold array has an element bit width of 16 bits.

6. The method of claim 1 where the first threshold array has an element bit width of 8 bits and the second threshold array has an element bit width of 12 bits.

7. The method of claim 1 further comprising:

performing tone correction using a two-part transfer function, where the first part has an output value range matching the first element bit width and the second part provides low-order bits to calculate transfer function values matching the second element bit width.

8. The method of claim 1 further comprising:

performing tone correction using a transfer function mapping an 8-bit wide input sample value to a tone-corrected output sample value that is more than 8 bits wide.

9. A method of building a first threshold array, comprising:

acquiring a second threshold array having a second threshold element bit width; and building a first threshold array having a first element bit width smaller than the second element bit width by scaling each value in the second threshold array down to the bit width of the first threshold array and storing each scaled value in the first threshold array.

10. The method of claim 9 where:

the first threshold element bit width is 8 bits and the second threshold element bit width is 16 bits; and the scaling is done by dividing by 257 and rounding up to the next whole number.

11. A raster output device configured to halftone a sample value drawn from a range of possible sample values having a sample value bit width, comprising:

a plurality of threshold arrays each having array elements in which are stored threshold values, each threshold array being characterized by the bit width of the threshold values stored in its array elements, the plurality of threshold arrays having among themselves a plurality of distinct array element bit widths;

means for selecting from the threshold arrays a threshold array having an element width least as large as the sample value bit width; and means for using the selected threshold array to halftone the sample value.

12. The raster output device of claim 11 where one of the plurality of threshold arrays has an element bit width identical to the sample value bit width.

13. A computer program, residing on a computer-readable medium, comprising instructions for causing a raster output device to:

receive a sample value drawn from a range of possible sample values having a sample value bit width;

provide a plurality of threshold arrays having array elements in which are stored threshold values, each threshold array being characterized by the bit width of its array elements, the plurality of threshold arrays comprising a first threshold array having a first element bit width and a second threshold array having a second element bit width wider than the first element bit width;

select from the threshold arrays a threshold array having an element bit width at least as large as the sample value bit width; and use the selected threshold array to halftone the sample value.

14. The computer program of claim 13 where the instructions to provide threshold arrays comprise instructions to:

build the first threshold array by scaling each value in the second threshold array down to the the first element bit width and storing each scaled value in the first threshold array.

15. The computer program of claim 13 where sample value bit width is 12 bits or 16 bits.

16. The computer program of claim 13 further comprising instructions to:

apply to 8-bit input values a transfer function of 256 elements mapping 8-bit input to tone-corrected 16-bit output values; and calculate the sample value as a shading function of tone-corrected output values of the transfer function.

17. The computer program of claim 13 further comprising instructions to:

calculate the sample value as a shading function; and tone correct the sample value by applying a table interpolated from a transfer function mapping 8-bit input to tone-corrected 16-bit output.

18. The method of claim 1, wherein the first threshold array has a bit width of 8 bits and the second threshold array has a bit width of 16 bits, the method further comprising:

performing tone correction using a two-part transfer function, where the first part has an output value range matching the first element bit width and the second part provides low-order bits to calculate transfer function values matching the second element bit width.

19. The method of claim 1, further comprising:

applying to 8-bit input values a transfer function of 256 elements mapping 8-bit input to tone-corrected 16-bit output values; and calculating the sample value as a shading function of tone-corrected output values of the transfer function.

20. The method of claim 1, further comprising:

calculating the sample value as a shading function; and tone-correcting the sample value by applying a table interpolated from a transfer function mapping 8-bit input to tone-corrected 16-bit output.

21. The raster output device of claim 11 where the first threshold array has an element bit width of 8 bits and the second threshold array has an element bit width of 16 bits.

22. The raster output device of claim 11, further comprising:

means for performing tone correction using a two-part transfer function, where the first part has an output value range matching the first element bit width and the second part provides low-order bits to calculate transfer function values matching the second element bit width.

23. The raster output device of claim 11, further comprising:

means for performing tone correction using a transfer function mapping an 8-bit wide input sample value to a tone-corrected output sample value that is more than 8 bits wide.

24. The computer program of claim 13 where one of the plurality of threshold arrays has an element bit width identical to the sample value bit width.

* * * * *

UNITED STATES PATENT AND TRADEMARK OFFICE
CERTIFICATE OF CORRECTION

PATENT NO.     : 5,898,820

DATED          : April 27, 1999

INVENTOR(S)    : Lars Borg,          Geoffrey C. Sherwood,

It is certified that error appears in the above-identified patent and that said Letters Patent is hereby corrected as shown below:

Title page, column 1, line 1 and item [54], change title from "DEVICE FOR INJECTING HIGH ENERGY LASER BEAM INTO OPTICAL FIBER" to --MULTIPLE-DEPTH THRESHOLD ARRAY--.

Signed and Sealed this

Eleventh Day of April, 2000

Attest:

Attesting Officer

Q. TODD DICKINSON

Director of Patents and Trademarks